UNITED STATES PATENT OFFICE.

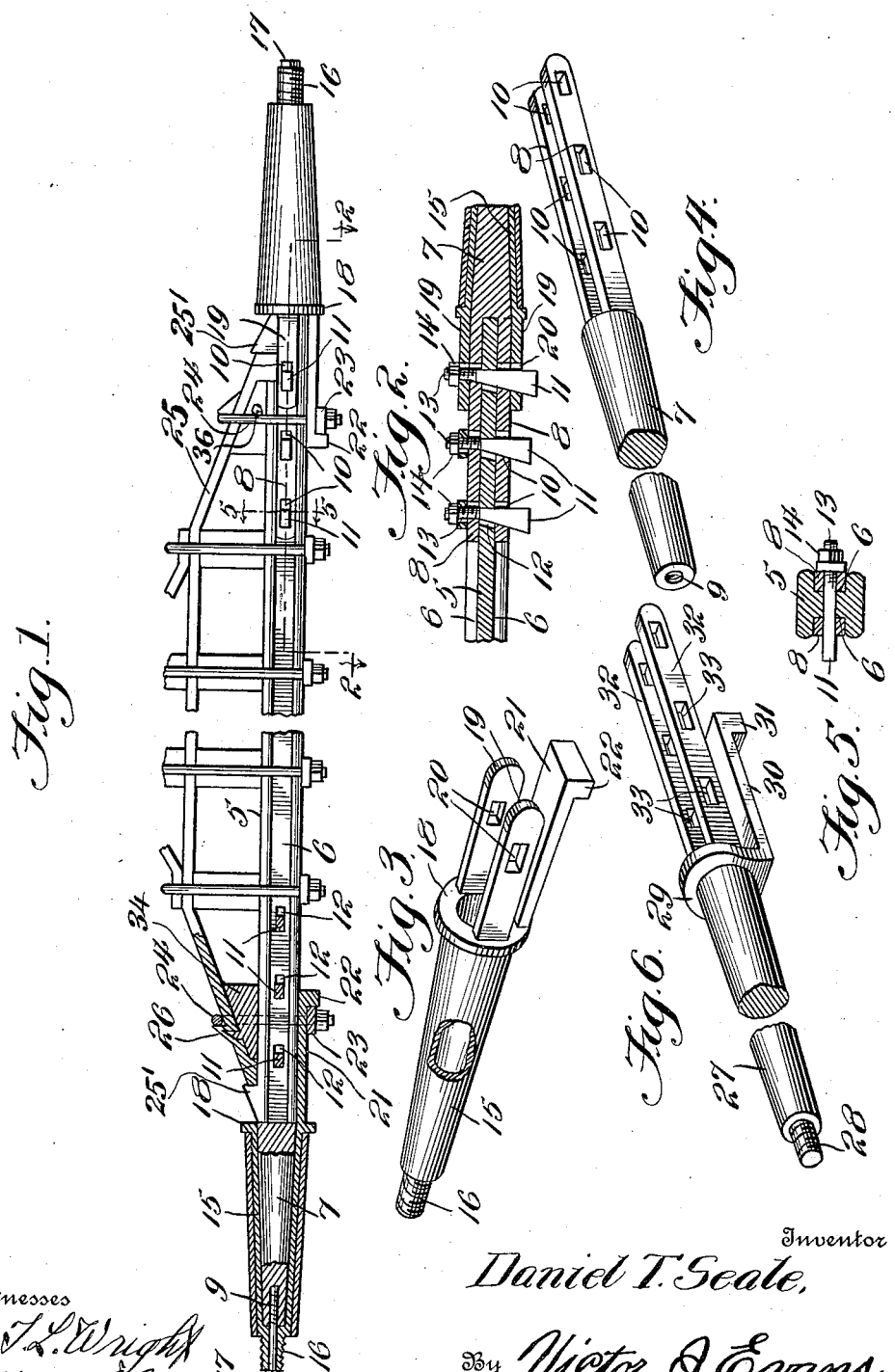

DANIEL T. SEALE, OF FLORALA, ALABAMA.

AXLE.

1,060,508.

Specification of Letters Patent. Patented Apr. 29, 1913.

Application filed April 17, 1912. Serial No. 691,282.

*To all whom it may concern:*

Be it known that I, DANIEL T. SEALE, a citizen of the United States, residing at Florala, in the county of Covington and State of Alabama, have invented new and useful Improvements in Axles, of which the following is a specification.

The invention relates to a vehicle axle, and more particularly to the class of detachable spindle ends and skeins therefor.

The primary object of the invention is the provision of a detachable spindle in which the inner end thereof is formed with a bifurcated extension adapted to be received in channels formed in opposite sides of the axle, so that the said extension can be conveniently and securely fastened to the axle for the connection of the spindle end thereto without possibility of weakening either the axle or the spindle, and at the same time enabling the said spindle to be easily and quickly detached when desired.

Another object of the invention is the provision of an axle wherein the same carries detachable spindles and axle skeins which when fastened to the axle will afford maximum strength and durability, yet the said spindle end and axle skein can be readily and conveniently detached so that either the axle spindle or the axle skein can be used separately as well as permitting the same to be repaired.

A further object of the invention is the provision of an axle in which the axle spindles are readily separable therefrom and when attached assure maximum strength thereto, the spindle being securely fastened to the axle so as to obviate the accidental detachment thereof should the same be subjected to severe usage.

A still further object of the invention is the provision of an axle construction of this character which is simple in construction, readily and easily assembled and disassembled, strong, durable, and inexpensive in manufacture.

With these and other objects in view the invention consists in the construction, combination and arrangement of parts as will be hereinafter more fully described, illustrated in the accompanying drawing, and pointed out in the claims hereunto appended.

In the drawing:—Figure 1 is a front elevation of an axle showing the spindles and axle skeins constructed in accordance with the invention mounted thereon, one of the skeins being shown in section and the spindle supporting the same partly broken away. Fig. 2 is a fragmentary horizontal sectional view on the line 2—2 of Fig. 1. Fig. 3 is a perspective view of the axle skein detached, the same being partly broken away. Fig. 4 is a perspective view of one of the spindles detached. Fig. 5 is a sectional view on the line 5—5 of Fig. 1. Fig. 6 is a perspective view of a modified form of spindle.

Similar reference characters indicate corresponding parts throughout the several views in the drawing.

Referring to the drawings by numerals, 5 designates the axle which is of substantially I-shape in cross section to provide grooves or channels 6 in opposite faces thereof, throughout the length of the same to form seats for a purpose presently described.

Adapted to be mounted on opposite ends of the axle 5 are detachable spindles 7 each being formed at its inner end with an inwardly extending bifurcated extension providing separated limbs 8, removably engaged in the seats formed by the channels 6 in the axle 5, while the outer end of the said spindle 7 has formed therein an internally threaded socket 9, the limbs 8 being provided with alining transverse openings 10, in which are engaged wedging keys 11, the same being passed through openings 12 formed transversely in the axle 5 and adapted to register with the openings 10, the keys being provided with reduced threaded ends 13 on which are adjustably engaged ordinary nuts 14 for the detachable fastening of the keys to secure the limbs 8 and the axle 5 together.

Telescoped upon each spindle 7 is an axle skein 15 formed at its outer closed end with a reduced externally threaded nut-receiving extension 16 through which is centrally passed a threaded bolt 17, the same detachably engaging in the threaded socket 9 in the outer end of the spindle 7 for assisting in fastening the axle skein thereon.

Formed at the inner end of the axle skein is an outturned annular flange 18 from diametrically opposite points of which project inwardly extending arms 19 the same lying against the outer side of the limbs 8 and are provided with alining openings 20 adapted to receive one of the keys 11 for the secure fastening of the skein 15 at the inner end thereof.

Formed on and projecting inwardly from the lowermost point of the flange 18 on the skein 15 is a flat tongue 21 provided with a downturned right-angularly disposed terminal lip 22 against which is engaged the cross connecting plate 23 of an inverted U-shaped clip 24 which straddles the axle 5 and likewise straddles the upwardly arched spanning bar 25 mounted upon the said axle 5 and adapted to support the bolster of the running gear of a vehicle, the axle 5 being formed at opposite terminals with abutment lugs 25′ against which engage the ends of the spanning bar 25, as shown in Fig. 1 of the drawing.

Struck up from the spanning bar 25 is a stop lug 26 against which bears the closed end of the clip 24 for preventing the loosening thereof or any displacement of the same when fastening the axle skein upon the spindle 7 of the axle.

In Fig. 6 there is shown a slight modification of axle spindle wherein the said spindle 27 is formed at its outer end with a reduced externally threaded nut receiving extension 28, while at its inner end is formed an outturned flange 29 provided at its lowermost point with an inwardly extending flat tongue 30 having a downturned right-angularly disposed terminal lip 31 adapted to abut the axle clip in a similar manner as hereinbefore described.

Formed on and projecting inwardly from diametrically opposite points of the flange 29 are arms 32 arranged in spaced parallel relation to each other, and provided with alining openings 33 for receiving the wedging keys 11, the said arms 32 being adapted for engagement in the seats formed by the channels 6 in the axle 5 for the connection of the spindle 27 therewith.

Interposed between the spanning bar 25 and the axle 5 are blocks 34, each being formed with opposed laterally extending pins 36 which are adapted to engage the clips 24, as shown in Fig. 1 of the drawings.

It is of course understood that when the spindle 27 is used the axle skein 15 is dispensed with and also the spindle 7 is detached from the axle.

From the foregoing, taken in connection with the accompanying drawing, it is thought that the construction and operation of the invention will be clearly understood, and therefore, a more extended explanation has been omitted.

What is claimed is:—

1. The combination with an axle having channels forming seats at opposite sides thereof and also provided with terminal lugs rising from its top, of a spanning bar supported by said axle and abutting against the lugs and having projections struck upwardly therefrom near the ends thereof, wheel supporting elements having limbs projecting from their inner ends and engaged in the seats in the axle, keys passed transversely through the limbs and axle for securing the elements thereto, extensions formed on the inner ends of the elements and resting against the under face of the axle, down-turned lips formed on the inner ends of the extensions, and clips embracing the spanning bar, axle and extensions and abutting against the lugs and said lips.

2. The combination with an axle having channels forming seats at opposite sides thereof and also provided with terminal lugs rising from its top, of a spanning bar supported by said axle and abutting against the lugs and having projections struck upwardly therefrom near the ends thereof, wheel supporting elements having limbs projecting from their inner ends and engaged in the seats in the axle, keys passed transversely through the limbs and axle for securing the elements thereto, extensions formed on the inner ends of the elements and resting against the under face of the axle, down-turned lips formed on the inner ends of the extensions, clips embracing the spanning bar, axle and extension and abutting against the lugs and said lips, blocks interposed between the spanning bar and axle near the ends thereof and engaged with the spanning bar for preventing displacement of the said blocks, and lateral projections integrally formed with the blocks and engageable with the clips.

In testimony whereof I affix my signature in presence of two witnesses.

DANIEL T. SEALE.

Witnesses:
E. EDMONSTON, Jr.,
FRANK O. PARKER.

---

Copies of this patent may be obtained for five cents each, by addressing the "Commissioner of Patents, Washington, D. C."